(12) United States Patent
Aakre et al.

(10) Patent No.: US 9,366,108 B2
(45) Date of Patent: *Jun. 14, 2016

(54) FLOW CONTROL DEVICE AND FLOW CONTROL METHOD

(71) Applicant: Statoil Petroleum AS, Stavanger (NO)

(72) Inventors: Haavard Aakre, Skien (NO); Vidar Mathiesen, Porsgrunn (NO); Bjørnar Werswick, Langesund (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 14/632,462

(22) Filed: Feb. 26, 2015

(65) Prior Publication Data

US 2015/0167426 A1    Jun. 18, 2015

Related U.S. Application Data

(63) Continuation of application No. 13/576,465, filed as application No. PCT/EP2011/051458 on Feb. 2, 2011, now Pat. No. 9,038,649.

(30) Foreign Application Priority Data

Feb. 2, 2010 (NO) ................................. 20100164

(51) Int. Cl.
*F16K 15/02* (2006.01)
*E21B 34/08* (2006.01)
(Continued)

(52) U.S. Cl.
CPC ............. *E21B 34/08* (2013.01); *E21B 33/1243* (2013.01); *E21B 43/08* (2013.01);
(Continued)

(58) Field of Classification Search
CPC ..... E21B 33/1243; E21B 43/12; E21B 34/08; E21B 43/32; F16K 11/10; F16K 11/02
USPC ...................................................... 137/535, 7
See application file for complete search history.

(56) References Cited

U.S. PATENT DOCUMENTS

| 3,314,440 A | 4/1967 | Horowitz |
| 4,577,691 A | 3/1986 | Huang et al. |
| 4,821,801 A | 4/1989 | Van Laar |
| 4,858,691 A | 8/1989 | Ilfrey et al. |

(Continued)

FOREIGN PATENT DOCUMENTS

| CN | 101111685 A | 1/2008 |
| GB | 2169018 A | 7/1986 |

(Continued)

*Primary Examiner* — Kevin Lee
*Assistant Examiner* — P. Macade Nichols
(74) *Attorney, Agent, or Firm* — Birch, Stewart, Kolasch & Birch, LLP

(57) ABSTRACT

The invention generally relates to a flow control device and a flow control methods. One embodiment provides a flow control device comprising: a first flow path to allow fluid to flow from an inlet port provided on an inlet side of the device to an outlet port provided on an outlet side of the device; a closure element arranged to prevent fluid flow along the first fluid path in a direction from the outlet port to the inlet port; and an arrangement adapted to open a second fluid path, different along at least part of its length from the first fluid path, in dependence upon the pressure of fluid at the outlet side, the second fluid path allowing fluid to flow from a first relief port provided on the outlet side to a second relief port provided on the inlet side, wherein the flow control device comprises an inner body part and an outer body part, the inner body part being sealingly arranged and moveable within the outer body part (4b; 40b) between a first position and a second position under the influence of the pressure of fluid at the outlet side, wherein a first part of the second fluid path is formed within the inner body part and a second part of the second fluid path is formed within the outer body part, the first and second parts of the second fluid path being in communication with one another when the inner body part is in the second position but not when the inner body part is in the first position, thereby opening the second fluid path when the inner body part moves from the first position to the second position.

14 Claims, 13 Drawing Sheets

(51) Int. Cl.
   *E21B 33/124*   (2006.01)
   *E21B 43/08*    (2006.01)
   *E21B 43/12*    (2006.01)
   *E21B 43/14*    (2006.01)
   *E21B 43/32*    (2006.01)
   *F16K 17/18*    (2006.01)

(52) U.S. Cl.
   CPC ............. *E21B 43/12* (2013.01); *E21B 43/14* (2013.01); *E21B 43/32* (2013.01); *F16K 17/18* (2013.01); *Y10T 137/0318* (2015.04); *Y10T 137/0352* (2015.04); *Y10T 137/0379* (2015.04); *Y10T 137/2605* (2015.04); *Y10T 137/7772* (2015.04); *Y10T 137/7773* (2015.04); *Y10T 137/7922* (2015.04)

(56) References Cited

U.S. PATENT DOCUMENTS

| | | |
|---|---|---|
| 5,447,201 A | 9/1995 | Mohn |
| 9,038,649 B2 * | 5/2015 | Aakre ................ E21B 33/1243 137/535 |
| 2006/0144218 A1 | 7/2006 | Jacobsen et al. |

FOREIGN PATENT DOCUMENTS

| | | |
|---|---|---|
| WO | WO 92/08875 A2 | 5/1992 |
| WO | WO 2005/080750 A1 | 9/2005 |
| WO | WO 2007/027617 A2 | 3/2007 |
| WO | WO 2008/004875 A1 | 1/2008 |
| WO | WO 2008/143522 A1 | 11/2008 |
| WO | WO 2009/136796 A1 | 11/2009 |

* cited by examiner

FLOW CONTROL DEVICE AND FLOW CONTROL METHOD

CROSS-REFERENCE TO RELATED APPLICATIONS

This application is a Continuation of copending application Ser. No. 13/576,465, filed on Sep. 19, 2012, which was filed as PCT International Application No. PCT/EP2011/051458 on Feb. 2, 2011, which claims priority under 35 U.S.C. §119(a) to Patent Application No. 20100164, filed in Norway on Feb. 2, 2010, all of which are hereby expressly incorporated by reference into the present application.

The present invention generally relates to a flow control device and flow control methods.

Devices for recovering oil and gas from long, horizontal and vertical wells are known from U.S. Pat. Nos. 4,821,801, 4,858,691, 4,577,691 and GB patent publication no. 2169018. These known devices comprise a perforated drainage pipe with, for example, a filter for control of sand around the pipe. A considerable disadvantage with the known devices for oil/and or gas production in highly permeable geological formations is that the pressure in the drainage pipe increases exponentially in the upstream direction as a result of the flow friction in the pipe. Because the differential pressure between the reservoir and the drainage pipe will decrease upstream as a result, the quantity of oil and/or gas flowing from the reservoir into the drainage pipe will decrease correspondingly. The total oil and/or gas produced by this means will therefore be low. With thin oil zones and highly permeable geological formations, there is further a high risk that of coning, i.e. flow of unwanted water or gas into the drainage pipe downstream, where the velocity of the oil flow from the reservoir to the pipe is the greatest.

From World Oil, vol. 212, N. 11 (11/91), pages 73-80, it is previously known to divide a drainage pipe into sections with one or more inflow restriction devices such as sliding sleeves or throttling devices. However, this reference is mainly dealing with the use of inflow control to limit the inflow rate for up hole zones and thereby avoid or reduce coning of water and or gas.

WO-A-9208875 describes a horizontal production pipe comprising a plurality of production sections connected by mixing chambers having a larger internal diameter than the production sections. The production sections comprise an external slotted liner which can be considered as performing a filtering action. However, the sequence of sections of different diameter creates flow turbulence and prevent the running of work-over tools.

The present applicant has identified that a possible limitation or problem with the valve or control device as disclosed in WO-A-9208875 in certain cases or applications is that substantially only one-way flow is possible through said valve or control device (although this might be a prerequisite or advantage in other cases or applications). Said limitation or problem is sought to be avoided or at least alleviated by the present applicant in providing some embodiments of the present invention.

According to a first aspect of the present invention, there is provided a flow control device comprising: a first flow path to allow fluid to flow from an inlet port provided on an inlet side of the device to an outlet port provided on an outlet side of the device; a closure element arranged to prevent fluid flow along the first fluid path in a direction from the outlet port to the inlet port; and an arrangement adapted to open a second fluid path, different along at least part of its length from the first fluid path, in dependence upon the pressure of fluid at the outlet side, the second fluid path allowing fluid to flow from a first relief port provided on the outlet side to a second relief port provided on the inlet side, wherein the flow control device comprises an inner body part and an outer body part, the inner body part being sealingly arranged and moveable within the outer body part between a first position and a second position under the influence of the pressure of fluid at the outlet side, wherein a first part of the second fluid path is formed within the inner body part and a second part of the second fluid path is formed within the outer body part, the first and second parts of the second fluid path being in communication with one another when the inner body part is in the second position but not when the inner body part is in the first position, thereby opening the second fluid path when the inner body part moves from the first position to the second position.

At least part of the first relief port for the second fluid path may be shared with or the same as the outlet port for the first fluid path.

At least part of the second relief port for the second fluid path may be separate from the inlet port for the first fluid path.

The arrangement may be adapted to open the second fluid path in response to the pressure of fluid at the outlet side exceeding the pressure of fluid at the inlet side by a predetermined amount.

The closure element may be a movable body provided along the first fluid path, the body being arranged such that changes in velocity and/or properties and/or composition of the fluid flowing along the first fluid path result in changes to the forces acting on the body as a result of the Bernoulli principle, thereby autonomously adjusting the flow of fluid through the control device.

The closure element may be arranged to face the inlet port.

The flow control device may comprise a resilient member arranged to provide a predetermined resistance against movement of the inner body part from the first position to the second position.

The resilient member may be an annular spring.

The annular spring may be arranged between a locking ring and an annular shoulder of the inner body.

An annular sealing member may be provided in an annular slot at the interface between the inner and outer body parts.

The second fluid path may bypass the closure element.

The flow control device may comprise a plurality of such second flow paths and/or a plurality of such outlet ports.

According to a second aspect of the present invention, there is provided a flow control method for use with a flow control device having a first flow path to allow fluid to flow from an inlet port provided on an inlet side of the device to an outlet port provided on an outlet side of the device, and a closure element arranged to prevent fluid flow along the first fluid path in a direction from the outlet port to the inlet port, the method comprising providing or using an arrangement to open a second fluid path, different along at least part of its length from the first fluid path, in dependence upon the pressure of fluid at the outlet side, the second fluid path allowing fluid to flow from a first relief port provided on the outlet side to a second relief port provided on the inlet side, wherein the flow control device comprises an inner body part and an outer body part, the inner body part being sealingly arranged and moveable within the outer body part between a first position and a second position under the influence of the pressure of fluid at the outlet side, wherein the method comprises a first part of the second fluid path being formed within the inner body part and a second part of the second fluid path being formed within the outer body part, the first and second parts of the second fluid path being in communication with one another when the inner body part is in the second position but not when the inner body part is in the first position, thereby opening the second fluid path when the inner body part moves from the first position to the second position.

According to a third aspect of the present invention, there is provided a method of controlling the flow of hydrocarbon fluid including any water between a hydrocarbon reservoir and a production pipe, the production pipe having one or more production sections, and the method comprising providing or using a flow control device according to the first aspect of the present invention in the or each production section of the production pipe.

The dependent claims define advantageous embodiments of the invention.

Reference will now be made, by way of example, to the accompanying drawings, in which.

Figure 11:
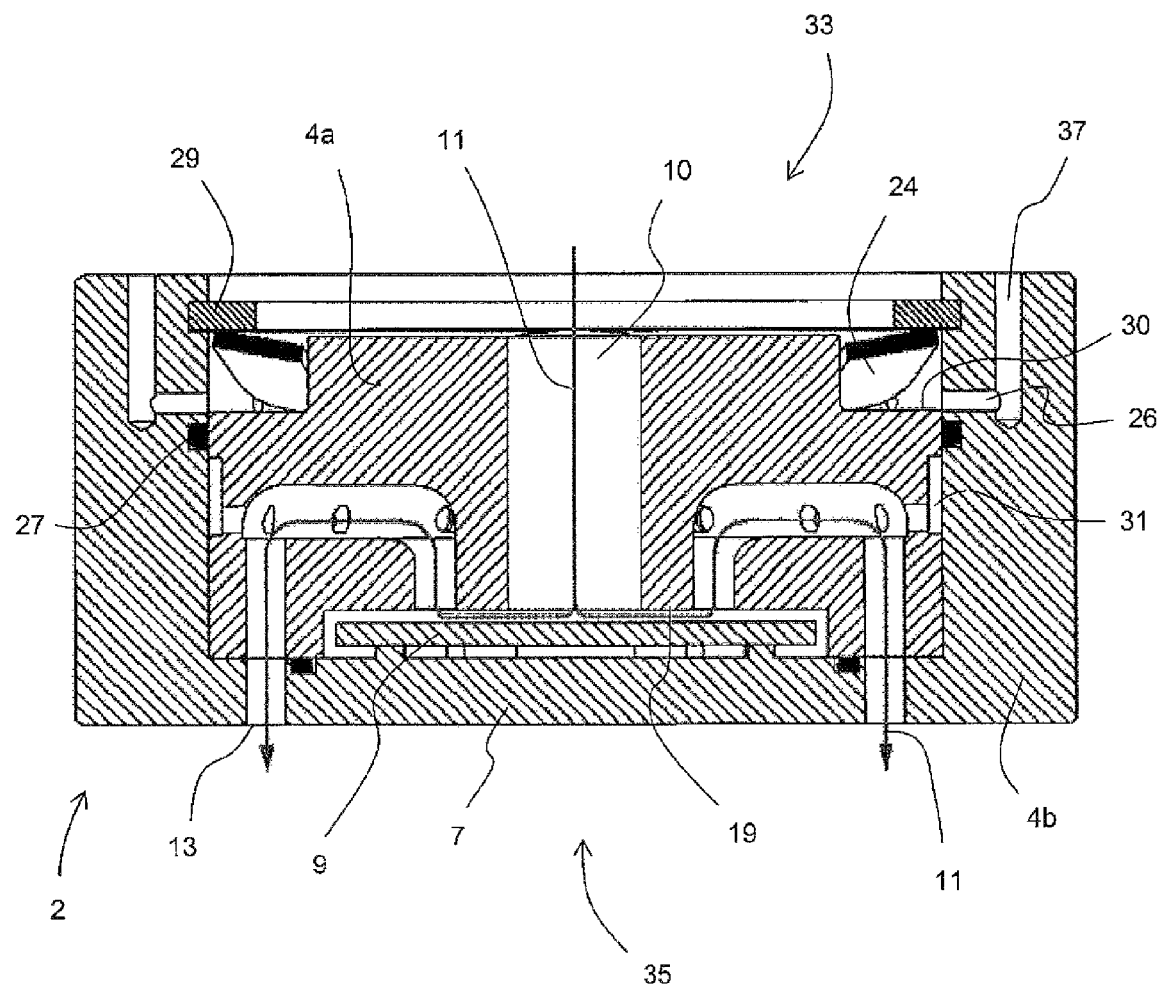
Figure 11:
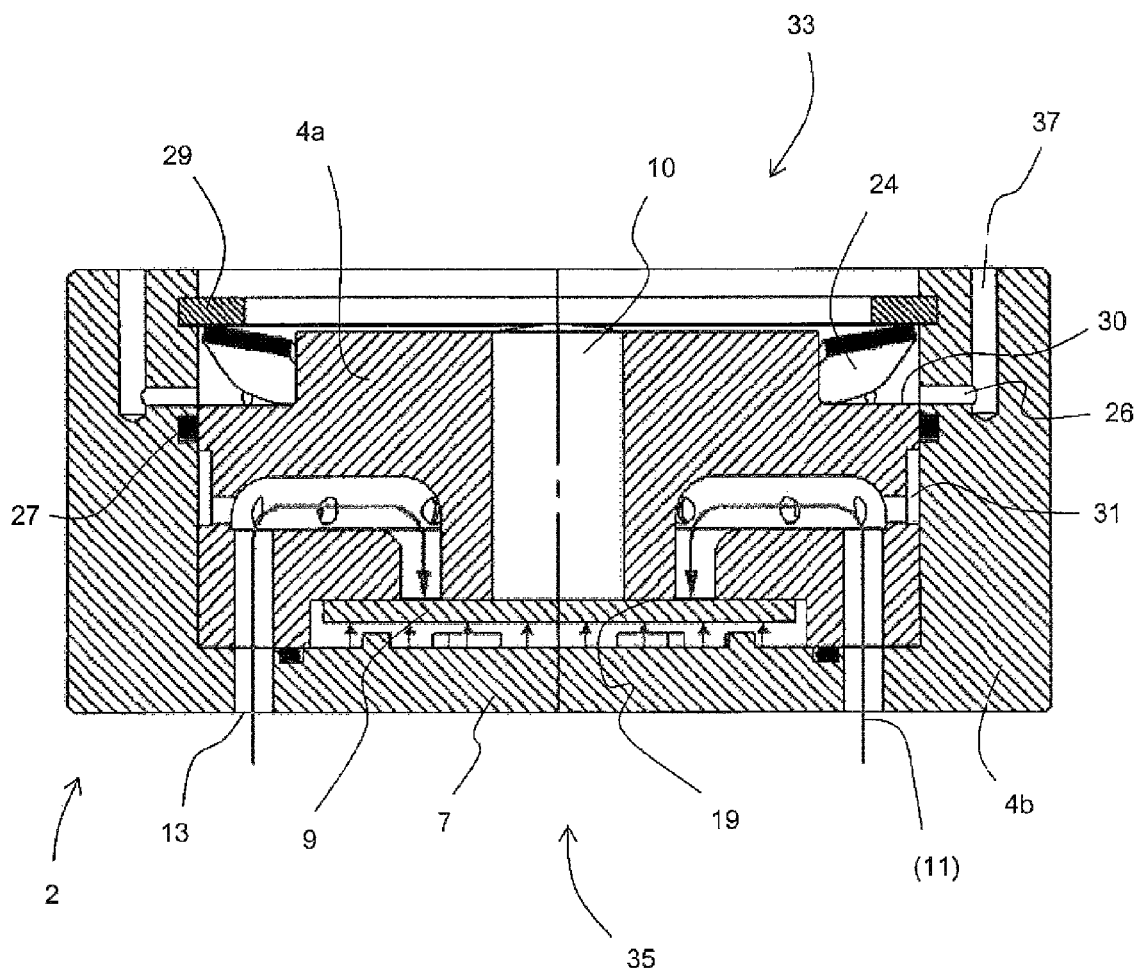
Figure 11:
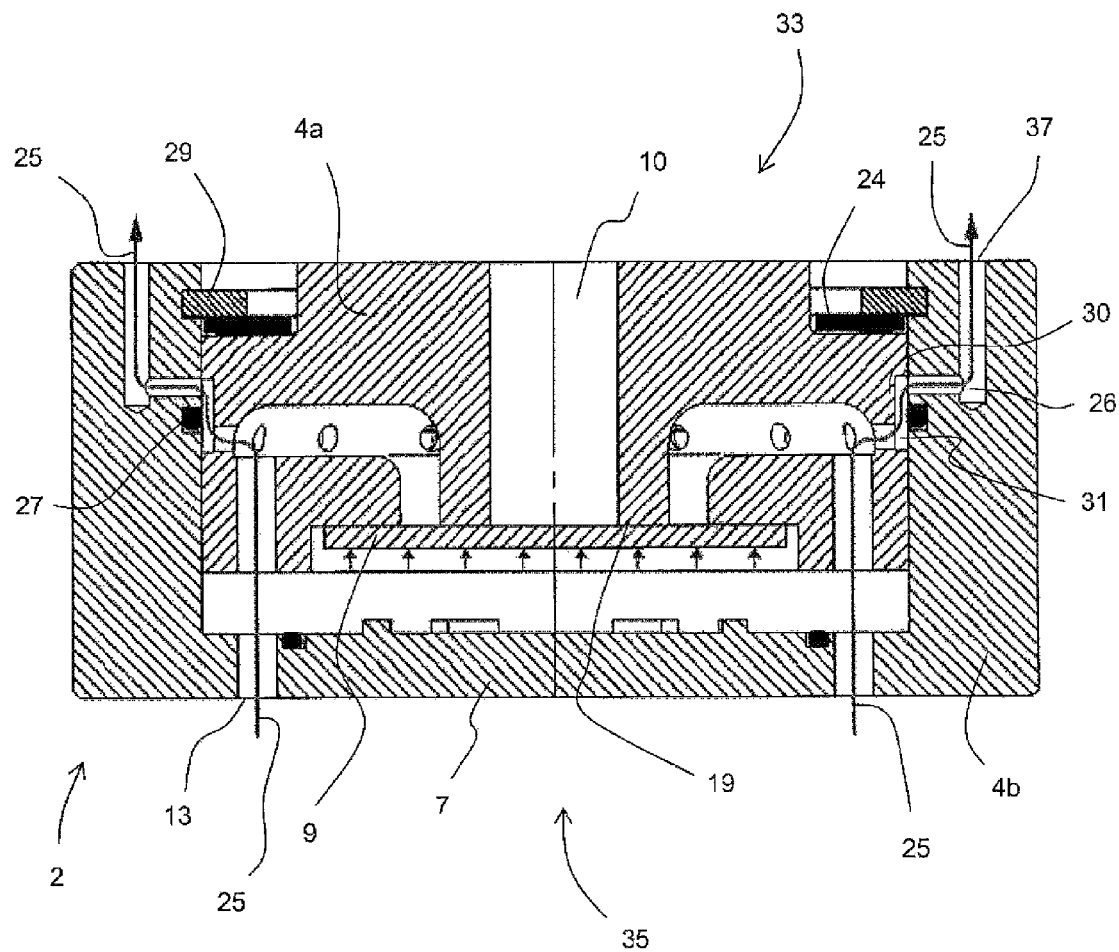

FIGS. 11 a)-c) are sectional views of the improved control device in a first mode of normal flow, in a second mode of substantially blocked reversed flow and a third mode of reversed flow, respectively.

Figure 12:
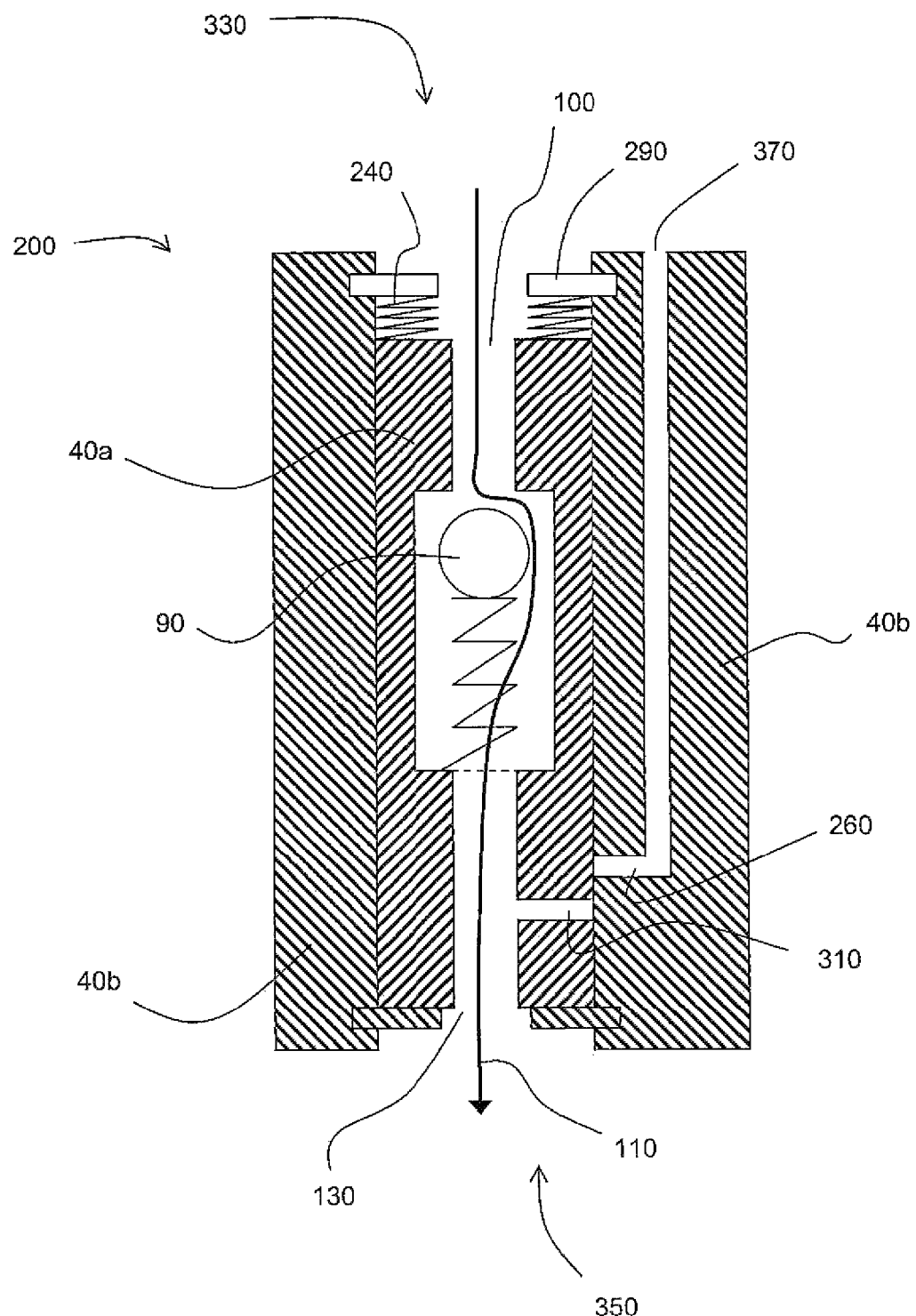
Figure 12:
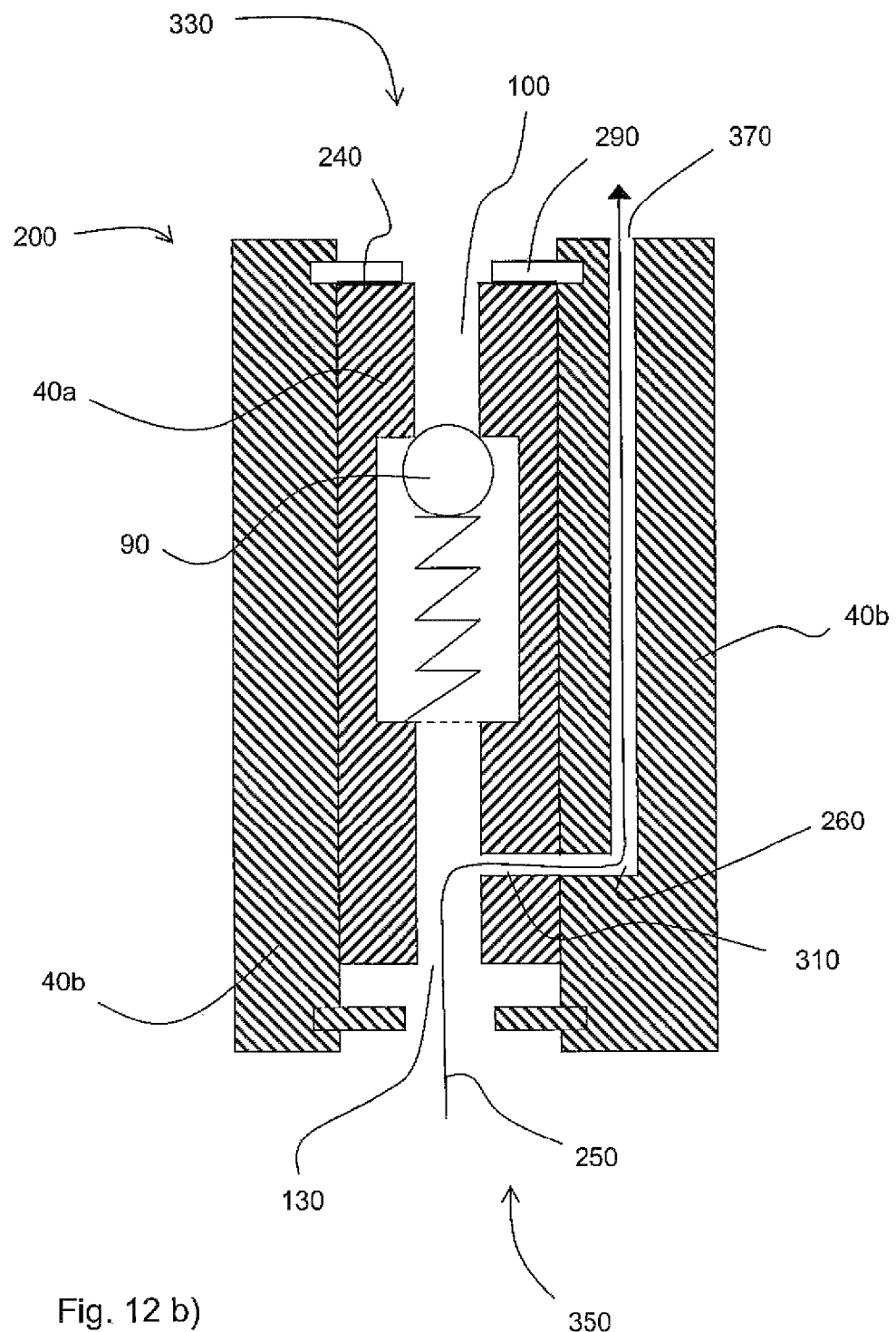

FIGS. 12 a) and b) are sectional views of another control device embodying the present invention in a first mode of normal flow, and a second mode of reversed flow, respectively.

Figure 13:
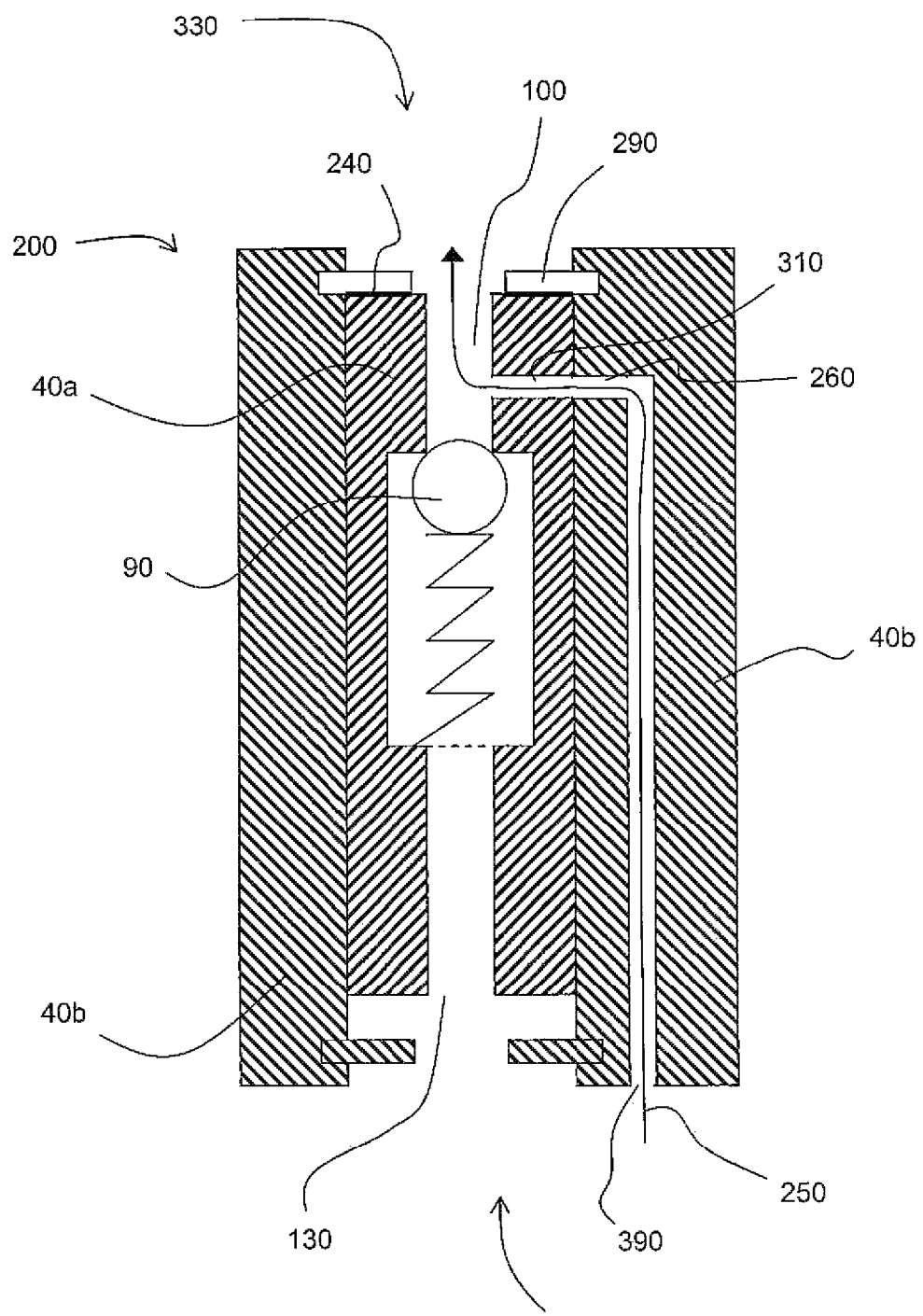

FIG. 13 illustrates a variation of the embodiment shown in FIG. 12 b).

Figure 1:
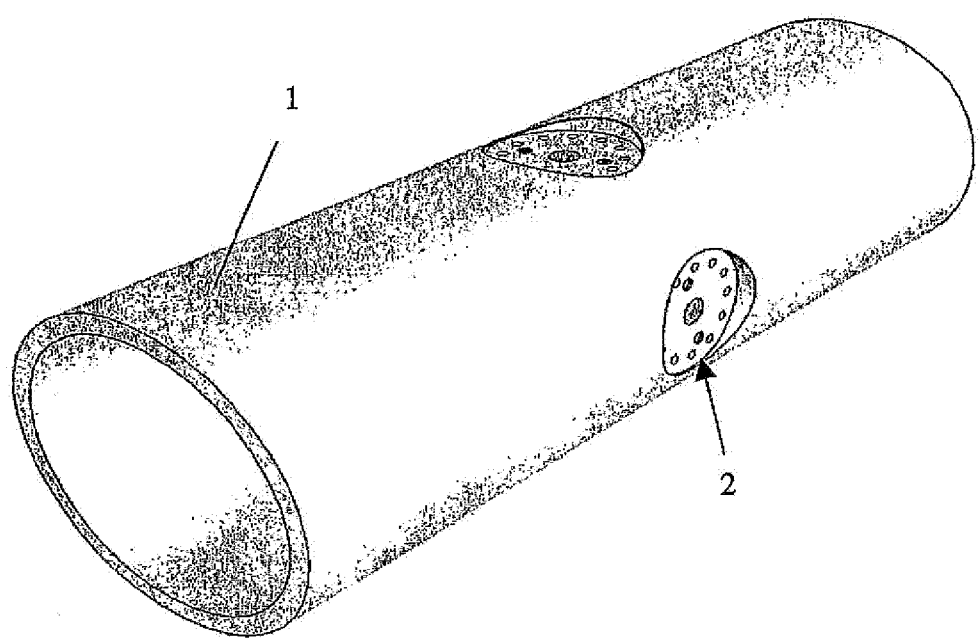
FIG. 1 shows a schematic view of a production pipe with a control device according to WO 2008/004875 A1, FIG. 2 a) shows, in larger scale, a cross section of the control device according to WO 2008/004875 A1, b) shows the same device in a top view.

FIG. 1 shows, as stated above, a section of a production pipe 1 in which a prototype of a control device 2 according to WO 2008/004875 A1 is provided. The control device 2, is preferably of circular, relatively flat shape and may be provided with external threads 3 (see FIG. 2) to be screwed into a circular hole with corresponding internal threads in the pipe. By controlling the thickness, the device 2 may be adapted to the thickness of the pipe and fit within its outer and inner periphery.

Figure 2:
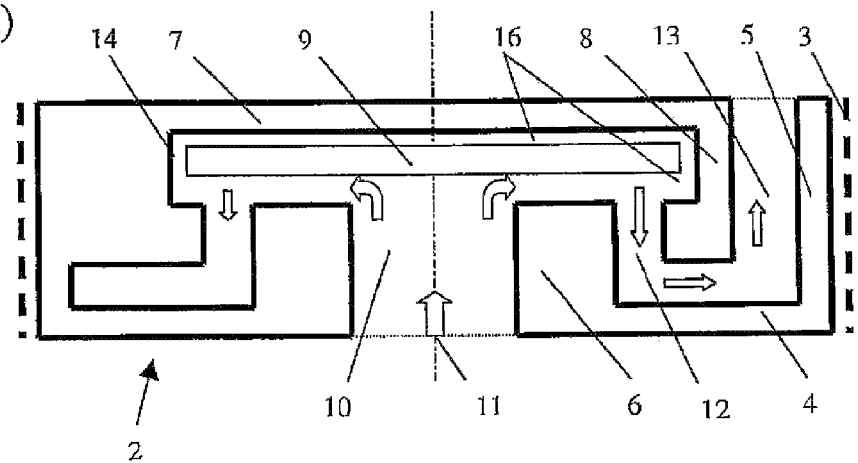
Figure 2:
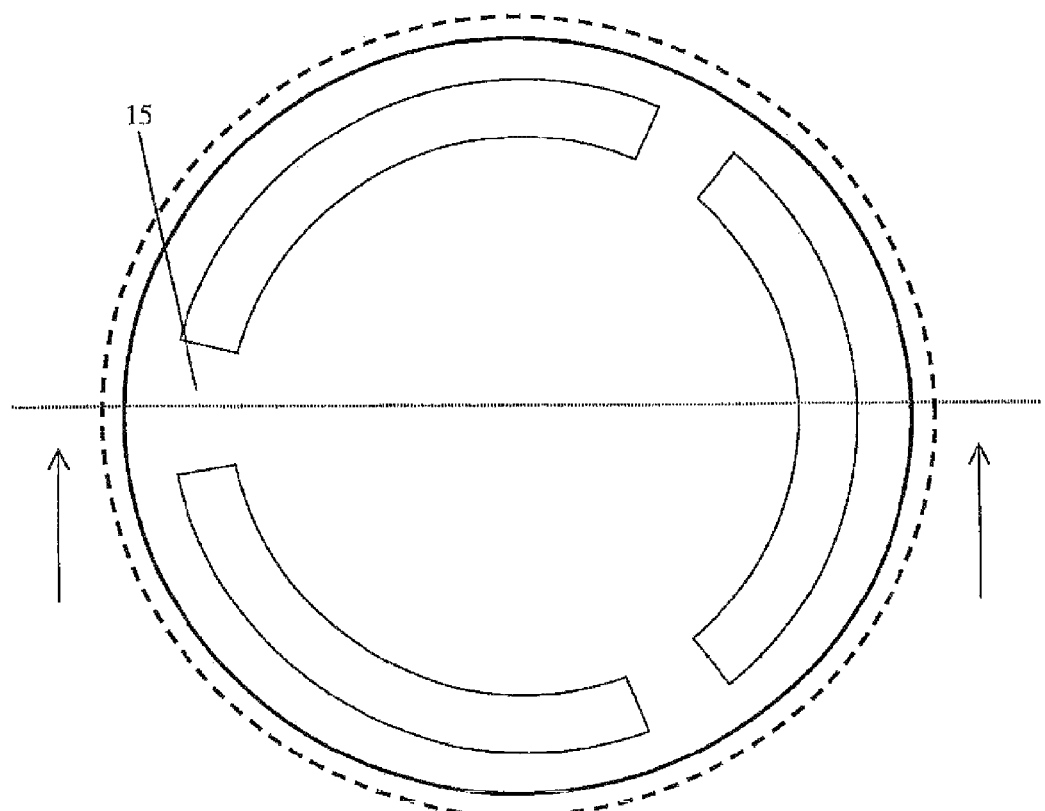

FIG. 2 a) and b) shows the prior control device 2 of WO 2008/004875 A1 in larger scale. The device consists of a first disc-shaped housing body 4 with an outer cylindrical segment 5 and inner cylindrical segment 6 and with a central hole or aperture 10, and a second disc-shaped holder body 7 with an outer cylindrical segment 8, as well as a preferably flat disc or freely movable body 9 provided in an open space 14 formed between the first 4 and second 7 disc-shaped housing and holder bodies. The body 9 may for particular applications and adjustments depart from the flat shape and have a partly conical or semicircular shape (for instance towards the aperture 10). As can be seen from the figure, the cylindrical segment 8 of the second disc-shaped holder body 7 fits within and protrudes in the opposite direction of the outer cylindrical segment 5 of the first disc-shaped housing body 4 thereby forming a flow path as shown by the arrows 11, where the fluid enters the control device through the central hole or aperture (inlet) 10 and flows towards and radially along the disc 9 before flowing through the annular opening 12 formed between the cylindrical segments 8 and 6 and further out through the annular opening 13 formed between the cylindrical segments 8 and 5. The two disc-shaped housing and holder bodies 4, 7 are attached to one another by a screw connection, welding or other means (not further shown in the figures) at a connection area 15 as shown in FIG. 2b).

One embodiment of the present invention exploits the effect of Bernoulli teaching that the sum of static pressure, dynamic pressure and friction is constant along a flow line:

$$p_{static} = \tfrac{1}{2}\rho v^2 + \Delta p_{friction}$$

When subjecting the disc 9 to a fluid flow, which is the case with one embodiment of the present invention, the pressure difference over the disc 9 can be expressed as follows:

$$\Delta p_{over} = [p_{over(P_4)} - p_{under(f(p_1,p_2,p_3))}] = \tfrac{1}{2}\rho v^2$$

Due to lower viscosity, a fluid such as gas will "make the turn later" and follow further along the disc towards its outer end (indicated by reference number 14). This makes a higher stagnation pressure in the area 16 at the end of the disc 9, which in turn makes a higher pressure over the disc. And the disc 9, which is freely movable within the space between the disc-shaped bodies 4, 7, will move downwards and thereby narrow the flow path between the disc 9 and inner cylindrical segment 6. Thus, the disc 9 moves down-wards or up-wards depending on the viscosity of the fluid flowing through, whereby this principle can be used to control (close/open) the flow of fluid through of the device.

Figure 3:
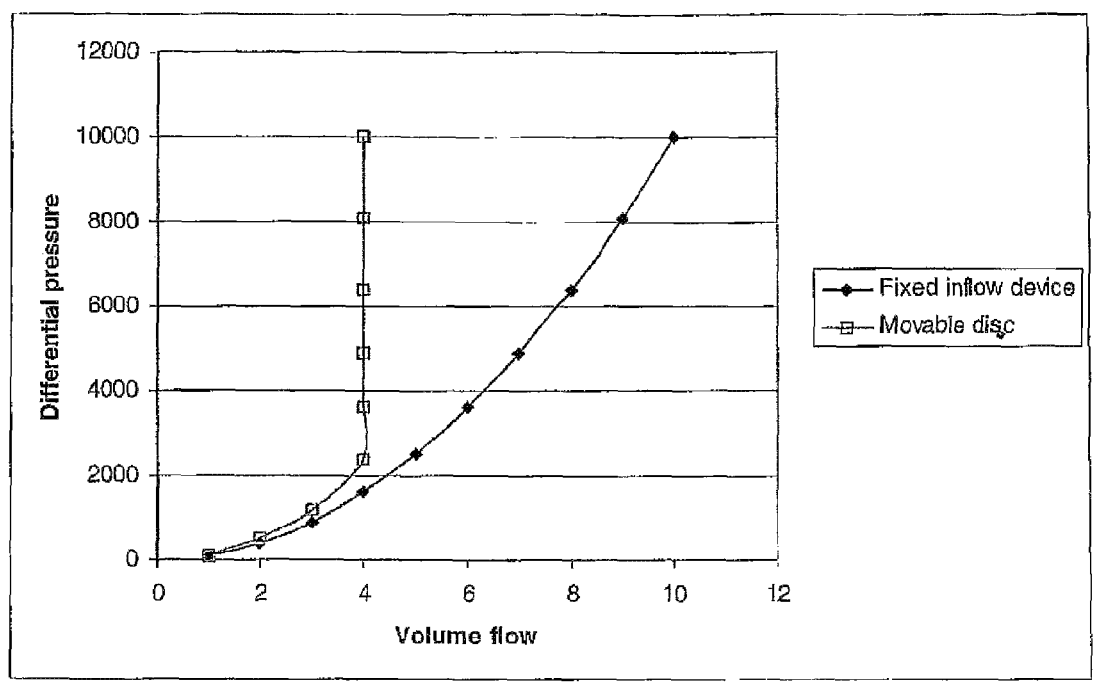
FIG. 3 is a diagram showing the flow volume through a control device according to WO 2008/004875 A1 vs. the differential pressure in comparison with a fixed inflow device.

Further, the pressure drop through a traditional inflow control device (ICD) with fixed geometry will be proportional to the dynamic pressure:

$$\Delta p = K \cdot \tfrac{1}{2}\rho v^2$$

where the constant, K is mainly a function of the geometry and less dependent on the Reynolds number. In the control device according to one embodiment of the present invention the flow area will decrease when the differential pressure increases, such that the volume flow through the control device will not, or nearly not, increase when the pressure drop increases. A comparison between a control device according to such an embodiment of the present invention with movable disc and a control device with fixed flow-through opening is shown in FIG. 3, and as can be seen from the figure, the flow-through volume for such an embodiment of the present invention is constant above a given differential pressure.

This represents a major advantage with such an embodiment of the present invention as it can be used to ensure the same volume flowing through each section for the entire horizontal well, which is not possible with fixed inflow control devices.

Figure 4:
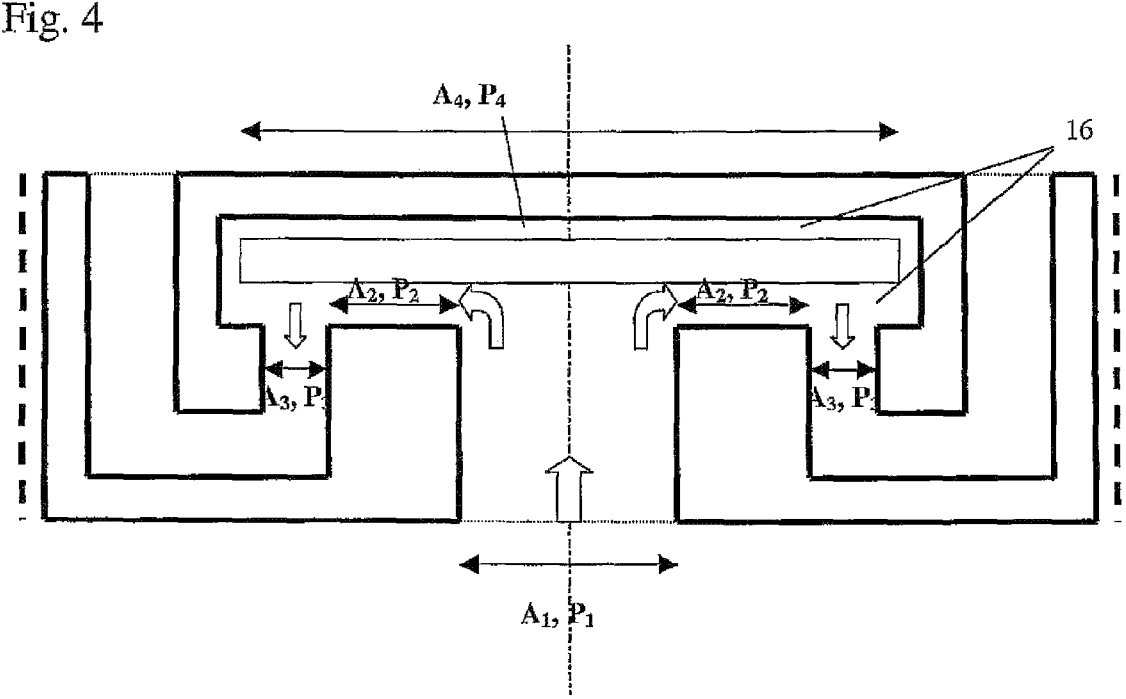
FIG. 4 shows the device shown in FIG. 2, but with the indication of different pressure zones influencing the design of the device for different applications.

When producing oil and gas a control device according to an embodiment of the invention may have two different applications: Using it as inflow control device to reduce inflow of water, or using it to reduce inflow of gas at gas break through situations. When designing a control device according to an embodiment of the invention for the different application such as water or gas, as mentioned above, the different areas and pressure zones, as shown in FIG. 4, will have impact on the efficiency and flow through properties of the device. Referring to FIG. 4, the different area/pressure zones may be divided into:

$A_1$, $P_1$ is the inflow area and pressure respectively. The force ($P_1 \cdot A_1$) generated by this pressure will strive to open the control device (move the disc or body 9 upwards).

$A_2$, $P_2$ is the area and pressure in the zone where the velocity will be largest and hence represents a dynamic pressure source. The resulting force of the dynamic pressure will strive to close the control device (move the disc or body 9 downwards as the flow velocity increases).

$A_3$, $P_3$ is the area and pressure at the outlet. This should be the same as the well pressure (inlet pressure).

$A_4$, $P_4$ is the area and pressure (stagnation pressure) behind the movable disc or body 9. The stagnation pressure, at position 16 (FIG. 2), creates the pressure and the force behind the body. This will strive to close the control device (move the body downwards). The area behind the body 9, at position 16, thus constitutes a stagnation chamber.

Fluids with different viscosities will provide different forces in each zone depending on the design of these zones. In order to optimize the efficiency and flow through properties of the control device, the design of the areas will be different for different applications, e.g. gas/oil or oil/water flow. Hence, for each application the areas needs to be carefully balanced and optimally designed taking into account the properties and physical conditions (viscosity, temperature, pressure etc.) for each design situation.

Figure 5:
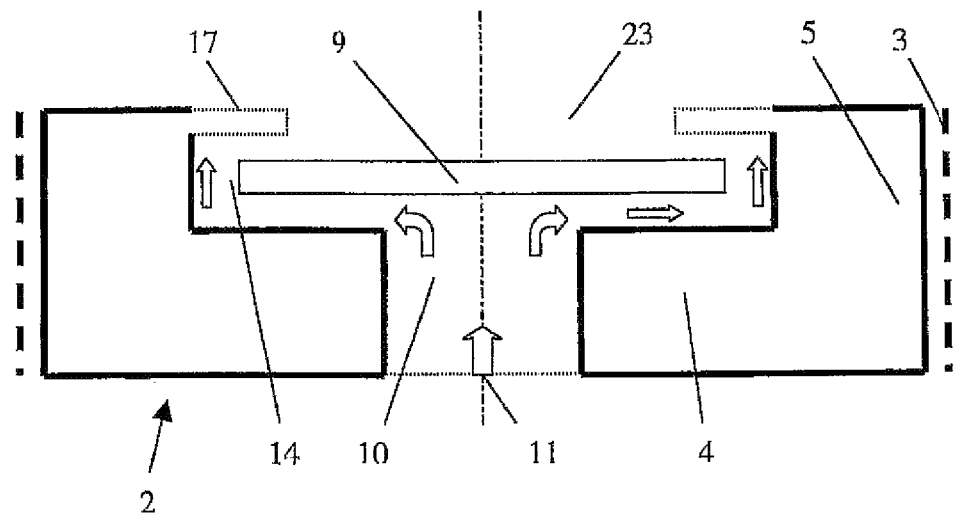
FIG. 5 shows a principal sketch of another embodiment of the control device according to WO 2008/004875 A1.

FIG. 5 shows a principal sketch of another embodiment of the control device according WO 2008/004875 A1, which is of a more simple design than the version shown in FIG. 2. The control device 2 consists, as with the version shown in FIG. 2, of a first disc-shaped housing body 4 with an outer cylindrical segment 5 and with a central hole or aperture 10, and a second disc-shaped holder body 17 attached to the segment 5 of the housing body 4, as well as a preferably flat disc 9 provided in an open space 14 formed between the first and second disc-shaped housing and holder bodies 4, 17. However, since the second disc-shaped holder body 17 is inwardly open (through a hole or holes 23, etc.) and is now only holding the disc in place, and since the cylindrical segment 5 is shorter with a different flow path than what is shown in FIG. 2, there is no build up of stagnation pressure ($P_4$) on the back side of the disc 9 as explained above in conjunction with FIG. 4. With this solution without stagnation pressure the building thickness for the device is lower and may withstand a larger amount of particles contained in the fluid.

Figure 6:
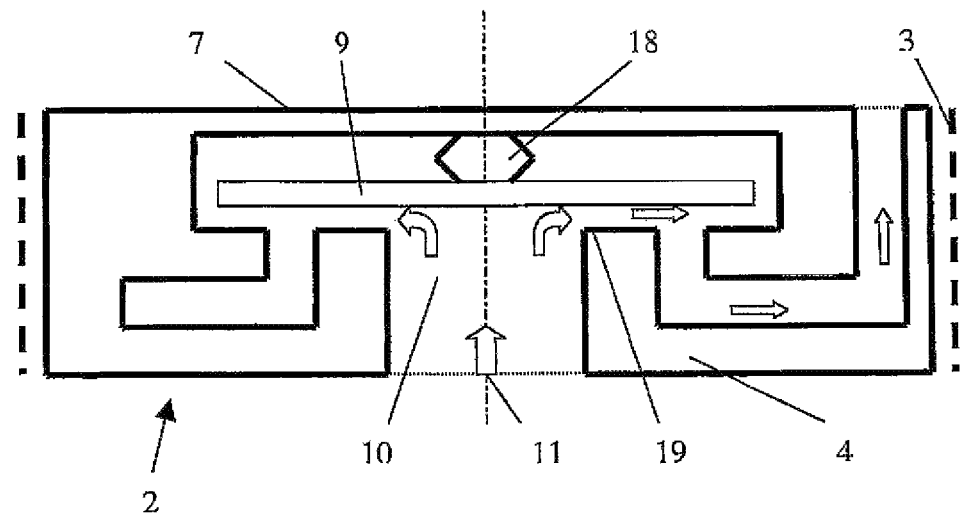
FIG. 6 shows a principal sketch of a third embodiment of the control device according to WO 2008/004875 A1.

FIG. 6 shows a third embodiment according to WO 2008/004875 A1 where the design is the same as with the example shown in FIG. 2, but where a spring element 18, in the form of a spiral or other suitable spring device, is provided on either side of the disc and connects the disc with the holder 7, 22, recess 21 or housing 4.

The spring element 18 is used to balance and control the inflow area between the disc 9 and the inlet 10, or rather the surrounding edge or seat 19 of the inlet 10. Thus, depending on the spring constant and thereby the spring force, the opening between the disc 9 and edge 19 will be larger or smaller, and with a suitable selected spring constant, depending on the inflow and pressure conditions at the selected place where the control device is provided, constant mass flow through the device may be obtained.

Figure 7:
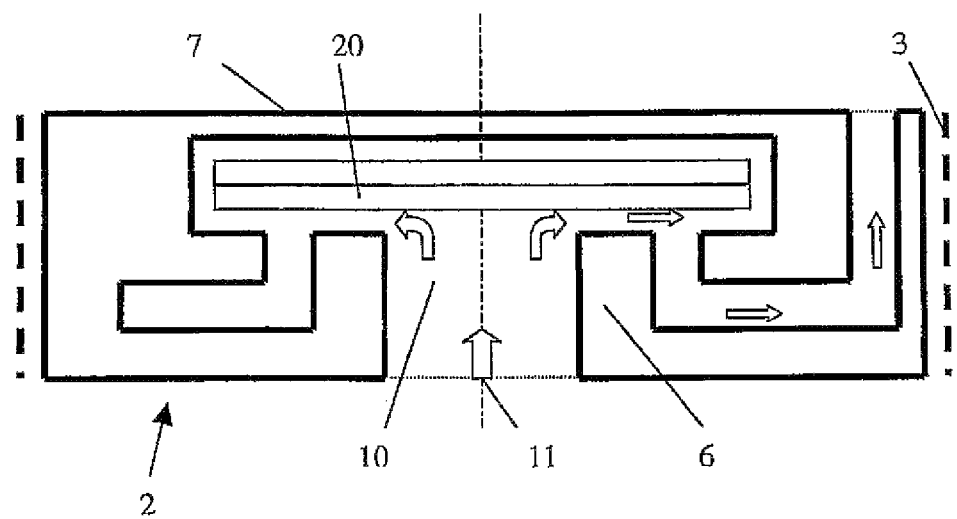
FIG. 7 shows a principal sketch of a fourth embodiment of the control device according to WO 2008/004875 A1.

FIG. 7 shows a fourth embodiment according to WO 2008/004875 A1, where the design is the same as with the example in FIG. 6 above, but where the disc 9 is, on the side facing the inlet opening 10, provided with a thermally responsive device such as bi-metallic element 20.

When producing oil and/or gas the conditions may rapidly change from a situation where only or mostly oil is produced to a situation where only or mostly gas is produced (gas breakthrough or gas coning). With for instance a pressure drop of 16 bar from 100 bar the temperature drop would correspond to approximately 20° C. By providing the disc 9 with a thermally responsive element such as a bi-metallic element as shown in FIG. 7, the disc will bend upwards or be moved upwards by the element 20 abutting the holder shaped body 7 and thereby narrowing the opening between the disc and the inlet 10 or fully closing said inlet.

Figure 8:
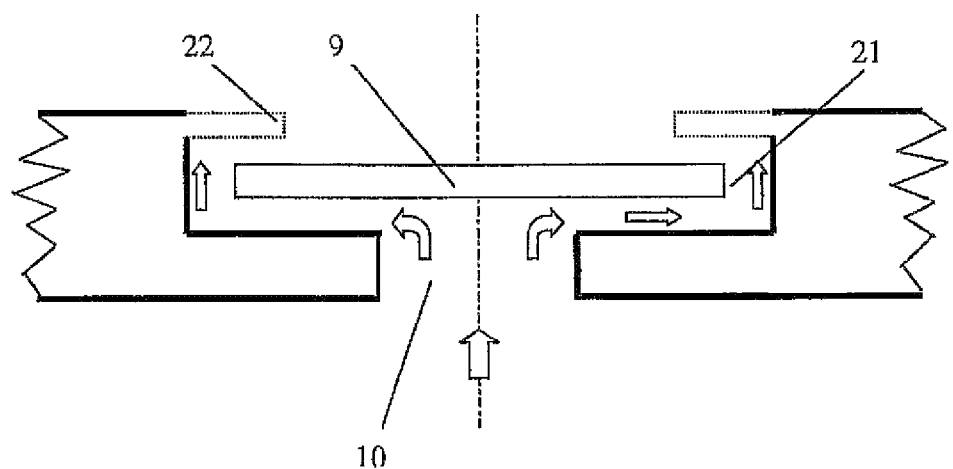
FIG. 8 shows a principal sketch of a fifth embodiment of WO 2008/004875 A1 where the control device is an integral part of a flow arrangement.

The above prior examples of a control device as shown in FIGS. 1 and 2 and 4-7 are all related to solutions where the control device as such is a separate unit or device to be provided in conjunction with a fluid flow situation or arrangement such as the wall of a production pipe in connection with the production of oil and gas. However, the control device may, as shown in FIG. 8, be an integral part of the fluid flow arrangement, whereby the movable body 9 may be provided in a recess 21 facing the outlet of an aperture or hole 10 of for instance a wall of a pipe 1 as shown in FIG. 1 instead of being provided in a separate housing body 4. Further, the movable body 9 may be held in place in the recess by means of a holder device such as inwardly protruding spikes, a circular ring 22 or the like being connected to the outer opening of the recess by means of screwing, welding or the like.

Figure 9:
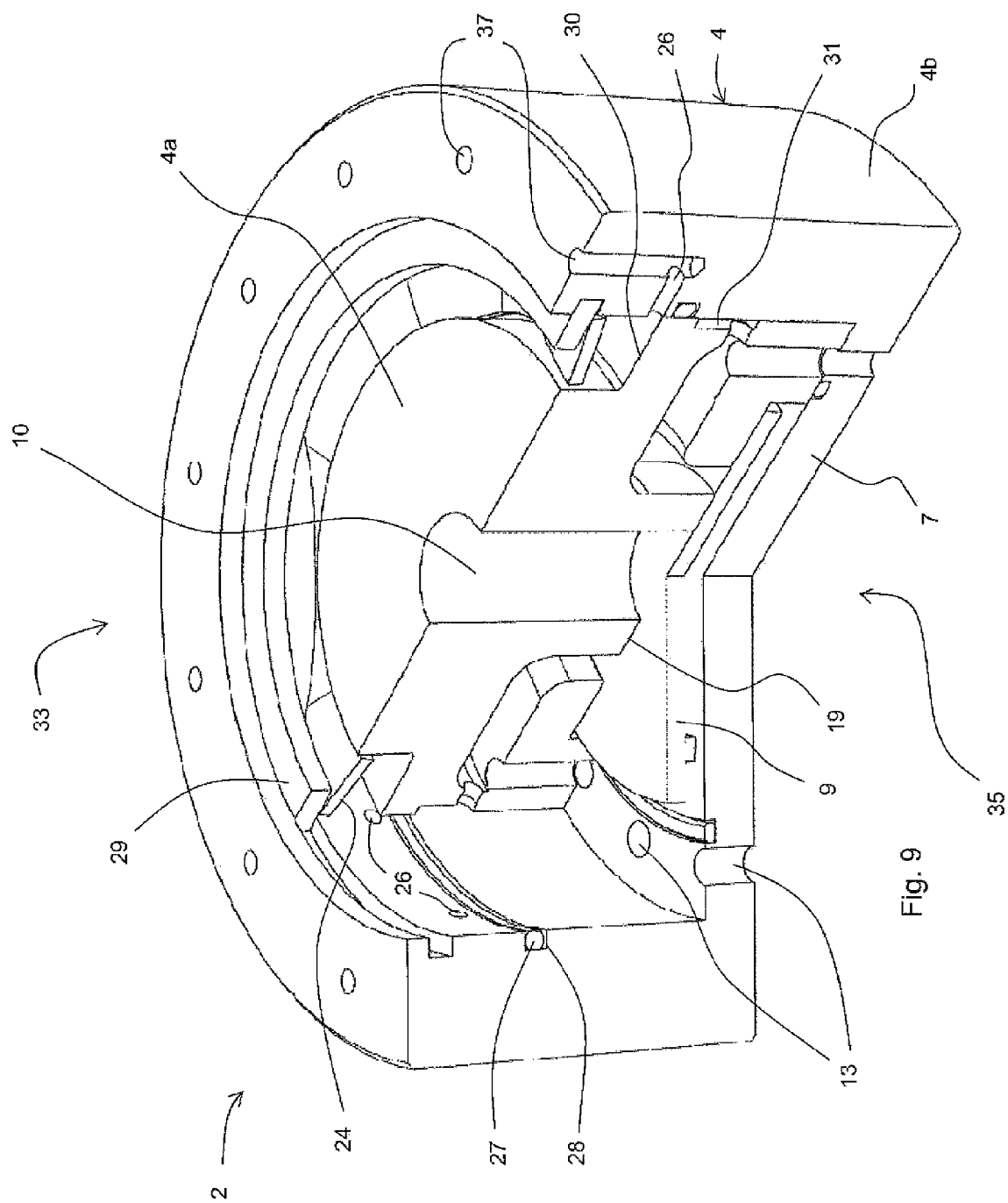
FIG. 9 shows a partly cutaway view of an improved control device according to an embodiment of the present invention.
Figure 10:
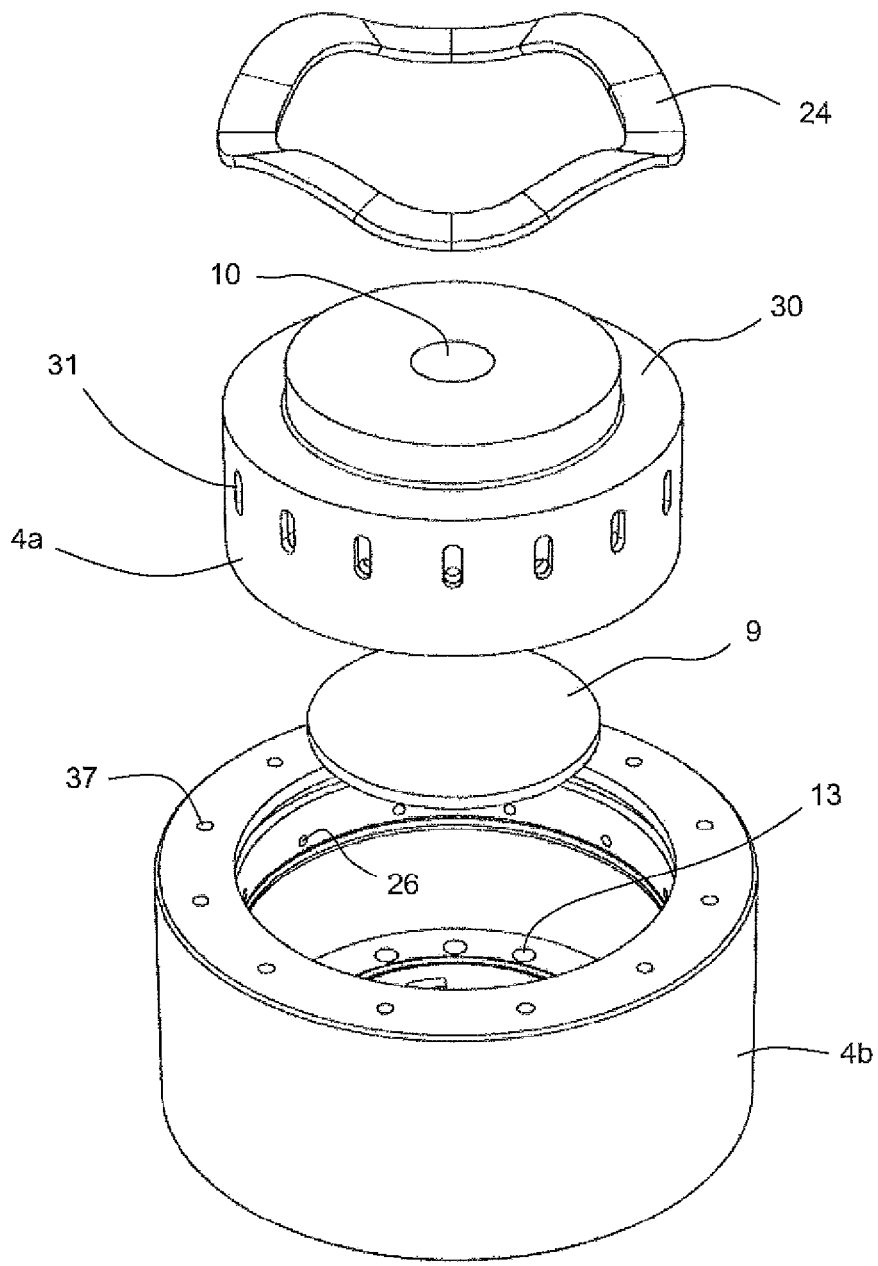
FIG. 10 shows an exploded view of the improved control device shown in FIG. 9.

FIGS. 9 and 10 show an improved control device or autonomous valve 2 according to an embodiment of the present invention, in a partly cutaway view and in an exploded view, respectively. The device is based closely on that shown in FIG. 4.

The control device 2 is shown comprising a freely movable controlling body 9 facing an inlet port or aperture 10 in the centre of the housing body 4 and being held in place in the housing body 4. A flow path 11—see FIG. 11 a)—is thereby formed in normal operation from the central inlet port or aperture 10 on an inlet side 33 of the control device 2, towards and along the body 9, and out of the recess or housing via an outlet port 13 on an outlet side 35 of the control device 2.

The housing body 4 comprises an inner body part 4a coaxially and sealingly arranged within a corresponding recess in an outer body part 4b. The inner body part 4a is axially movable within the outer body part 4b between a first position and a second position, with a resilient member 24 arranged to provide a predetermined biasing force to resist movement of the inner body part 4a from the first position to the second position. Movement of the inner body part 4a from the first position to the second position is caused by an overpressure acting on the outlet side 35 of the control device 2 opposite of an inlet side 33, with the overpressure exceeding said predetermined biasing force of the resilient member 24.

As will be explained in further detail below with reference to FIG. 11, the first and second positions respectively provide normal operation via the flow path 11 and reversed flow operation of the valve or control device 2, wherein in said second position the flow path 11 is closed and a second flow path 25 of reversed flow is created. For the purpose of providing the second flow path 25, at least one branch channel 31 is provided in the inner body part 4a (downstream of the controlling body 9 under normal operation) and at least one corresponding channel 26 is provided in the outer body part 4b. Each channel 26 provided in the outer body part 4b extends from an axial interface between the inner and outer body parts 4a, b and opens to a relief port 37 on the inlet side 33 of the control device 2.

The closing or blocking of the flow path 11 in the second position of reversed flow is caused by said overpressure pressing the controlling body 9 sealingly against a seat 19 of the inlet 10 at the same time as the inner body part 4a is lifted in said recess causing the movement into said second position of reversed flow.

Before reaching the second position in which a reverse flow path is created, the branch channel 31 provided in the inner body part 4a does not align with its corresponding channel 26 provided in the outer body part 4b, so that no fluid flows along the branch channel 31, and no fluid can reach the channels 26 provided in the outer body part 4b.

However, as pressure on the outlet side 35 of the control device 2 causes the inner body part 4a to move within the outer body part 4b, so eventually the branch channel 31 provided in the inner body part 4a comes into alignment with its corresponding channel 26 provided in the outer body part 4b, thereby allowing fluid to flow from the outlet port 13 along the branch channel 31 and thence along the channel 26 provided in the outer body part 4b, and then to the relief port 37 on the inlet side 33, completely bypassing the body 9. The branch channel 31 provided in the inner body part 4a comes into alignment with its corresponding channel 26 provided in the outer body part 4b, thereby to open the reverse flow path 25, when the pressure of the fluid at the outlet side 35 exceeds a predetermined value. The predetermined value is determined in part by the characteristics of the resilient member 24 (such as its spring constant) and in part on the forces acting on the inner body part 4a due to the pressure of the fluid at the inlet side 33. In this embodiment it can therefore be considered that the reverse fluid path 25 is caused to open in response to the pressure differential (fluid pressure at the outlet side 35 minus fluid pressure at the inlet side 33) exceeding a predetermined value (or, in other words, in response to the fluid pressure at the outlet side 35 exceeding the fluid pressure at the inlet side 33 by a predetermined amount).

An annular gasket 27 is preferably provided in an annular slot 28 at the interface between the inner and outer body parts 4a, 4b.

Preferably, the resilient member 24 is an annular spring is arranged between a locking ring 29 and an annular shoulder 30 of the inner body 4a.

A plurality of channels 26 are, as shown in FIGS. 9-11, preferably equidistantly and circularly arranged at the interface between the inner and outer body parts 4a, 4b, and a plurality of branch channels 31 are preferably equidistantly and circularly arranged at the side of the valve 2 oppositely of the inlet 10.

In FIG. 11 there are shown three different modes of the improved valve or control device 2 according to an embodiment of the present invention.

FIG. 11 a) shows a mode of "normal" flow of the valve 2, as is obtainable in the related valve or control device disclosed in WO 2008/004875 A1, and thus explaining the term "normal".

FIG. 11 b) further shows a zero flow mode in which the fluid pressure affecting the inner body part 4a of the valve 2 is less than the force of the annular spring 24. The valve or control device 2 thus acts like a check valve with zero or low flow rate through the valve 2 (the flow path 11 is shown in brackets, to indicate that it is no longer a complete path through the device 2). Also this mode is obtainable by the related valve or control device disclosed in WO 2008/004875 A1.

Finally, FIG. 11 c) shows a reversed flow mode, in which the fluid pressure acting on the inner body part 4a exceeds the force of the annular spring 24 and the inner body part is lifted within the outer body part 4b, which causes a high flow rate in an opposite direction through the valve or control device 2 via the second flow path 25.

According to an embodiment of the present invention there is further provided a method for reversed flow through an improved self-adjustable (autonomous) valve or flow control device 2 as described above, comprising the step of providing an overpressure on the outlet side 35 of the valve 2 opposite of the inlet side 33 exceeding a predetermined biasing force of the resilient member 24 causing lifting of the inner body part 4a within the outer body part 4b against said biasing force from a first position of fluid flow between an inner and an outer side of the valve 2 via the flow path 11 and to a second position of reversed fluid flow between said inner and outer side through the second flow path 25.

According to an embodiment of the present invention there is still further provided use of a self-adjustable (autonomous) valve or flow control device as described above as a check valve in a reversed flow mode, e.g. when injecting steam or scale inhibitor down the production pipe of a well and into an adjacent formation or reservoir or for stimulation or well control.

Advantageously the improved self-adjustable (autonomous) valve or flow control device 2 according to an embodiment of the invention allows reversed flow in addition to the (normal) flow from the reservoir and into the well. As also indicated in the above paragraph this is important e.g. in the following cases.

Injection of scale inhibitor. Heavily soluble matter may plug or obstruct oil wells and tubing and scale should thus be prevented. Scale inhibitor must be injected into the reservoir from the well to prevent depositions from being created. This may be made either periodically (squeeze) or continuously.

Injection of steam. When producing bitumen heating of the reservoir is required in order to liquefy the bitumen, and which may either be made continuously or periodically.

Injection of solvent. The same as above. In some cases solvent (e.g. $CO_2$) may be injected in order to reduce viscosity.

Stimulation. Treatment in order to re-establish or improve the productivity of a well. Stimulation may be divided into two main groups; "hydraulic fracturing" and "matrix" treatments. "Fracturing" is made by means of pressure above the "fracture pressure" of the formation, and creates large open flow paths between reservoir and well. "Matrix" is made by means of pressure below "fracture pressure" and is used in order to re-establish the natural permeability of the reservoir after damages close to the well.

Well control. By completion of the well it is important to control the pressure in the well and the reservoir. This may be made by pressing fluid from the well and into the reservoir, such that an overpressure in the well is obtained. If the pressures are not correctly handled an uncontrolled blow out may in a worst case result.

It will be appreciated that the inventive concept is independent of the autonomous nature of the flow control device 2 described above with reference to FIGS. 9 to 11 (and prior to that with reference to the previous disclosure upon which the embodiment of FIGS. 9 to 11 is closely based).

In this regard, the inventive concept can be considered to be the use of a flow control device comprising: a first flow path to allow fluid to flow from an inlet port provided on an inlet side of the device to an outlet port provided on an outlet side of the device; a closure element arranged to prevent fluid flow along the first fluid path in a direction from the outlet port to the inlet port; and an arrangement adapted to open a second fluid path, different along at least part of its length from the first fluid path, in response to the pressure of fluid at the outlet side exceeding a predetermined value, the second fluid path allowing fluid to flow from a relief port provided on the outlet side to a relief port provided on the inlet side. In the embodiment described above with reference to FIGS. 9 to 11, the "closure element" of the above inventive concept is the movable body 9 of the autonomous valve 2.

To illustrate the application of the present invention to one type of flow control device that is not of an autonomous nature, a schematic representation of a ball check valve 200 embodying the present invention is presented in FIGS. 12 a) and 12 b). It is not necessary to go into any detail in describing the ball check valve 200 of FIG. 12, because the skilled person will readily appreciate the similarity to the control device 2 described above with reference to FIGS. 9 to 11.

Parts of the FIG. 12 device that are equivalent to corresponding respective parts of the FIGS. 9 to 11 device are given reference numerals that are 10× that of the earlier embodiment (with the exception that device 200 of FIG. 12 is equivalent to device 2 of FIGS. 9 to 11). For example, parts 90, 40a, and 290 of FIG. 12 are equivalent to parts 9, 4a and 29 of FIGS. 9 to 11. The ball 90 is the "closure element" of the inventive concept described above, and is roughly equivalent to the movable body 9 of the earlier embodiment.

FIG. 12 a) corresponds closely to FIG. 11 a), showing operation of the control device in the "normal" mode, while FIG. 12 b) corresponds closely to FIG. 11 c), showing operation of the control device in the "reverse flow" mode. In a manner similar to that described above, a reverse flow path 250 is opened up when the inner body part 401 moves sufficiently within the outer body part 40b to align the two channels 310 and 260.

The skilled person will appreciate that the invention is also applicable to types of flow control device other than an autonomous type (FIGS. 9 to 11) and a ball check valve (FIG. 12), these merely being examples.

Referring to parts of the main embodiment described above, it will be appreciated that the reverse-flow fluid path 25 need not share a port 13 on the outlet side 35 of the device 2 with the forward-flow path 11. For example, a separate port on the outlet side 35 of the device 2 can be provided with a channel through the outer body part 4b which links to a corresponding channel provided through the inner body part 4a towards the inlet side 33 of the device 2, thereby opening the reverse-flow path 25. The reverse-flow path 25 can either link into the inlet port 10, or can drain to a separate port on the inlet side 33 of the device 2.

Such a variation is illustrated in FIG. 13, which is based closely on the embodiment described above with reference to FIG. 12. In FIG. 13, a separate relief port 390 is provided on the outlet side 350 of the device 200, with a channel through the outer body part 40b, which communicates in the reverse flow mode (i.e. as depicted in FIG. 13) with a corresponding channel through the inner body part 40a, and thence to the inlet port 100. Therefore, in the FIG. 13 arrangement, the relief port on the inlet side 330 for the reverse path 250 is shared with the inlet port 100 for the forward flow path 110. One could also have an arrangement where the reverse path begins in the outer body part 40b, then passes into the inner body part 40a, and then back to the outer body part 40b, thereby having relief ports at both ends that are separate from the inlet and outlet ports of the forward fluid path. Even if the reverse flow path begins and/or ends in the inner body part 40a, there could be a separate relief port provided for the reverse flow path 250 to that of the forward flow path 110.

Although in the main embodiment described above it is said that the reverse fluid path 25 is caused to open in response to the fluid pressure at the outlet side 35 exceeding the fluid pressure at the inlet side 33 by a predetermined amount, in another embodiment the reverse fluid path may be caused to open in response to the fluid pressure at the outlet exceeding a predetermined value, irrespective of the fluid pressure at the inlet (for example, a particular pressure deemed to represent a danger). This would be the case if a mechanism were used to open the second fluid path which acted in dependence upon the outlet fluid pressure in isolation. Therefore, although in the main application envisaged for an embodiment this invention, the second fluid path would open when the outlet pressure exceeds the inlet pressure (by a predetermined amount, which may be zero), this is not essential. In general, though, it can be said that the reverse fluid path is caused to open in dependence upon the pressure of fluid at the outlet side.

The present invention as defined in the claims is not restricted to the application related to inflow of oil and/or gas from a well as described above or when injecting gas (natural gas, air or $CO_2$), steam or water into an oil and/or gas producing well. Thus, the invention may be used in any processes or process related application where the flow of fluids with different gas and/or liquid compositions needs to be controlled.

According to a first arrangement, there is provided a self-adjustable (autonomous) valve or flow control device (2) for controlling the flow of a fluid from one space or area to another, in particular useful for controlling the flow of fluid, i.e. oil and/or gas including any water, from a reservoir and into a production pipe of a well in the oil and/or gas reservoir, which production pipe includes a lower drainage pipe preferably being divided into at least two sections (1) each including one or more inflow control devices (2) which communicates the reservoir with a flow space of the drainage pipe, including a freely movable controlling body (9) being arranged in a housing body (4), the controlling body (9) facing the outlet of an aperture or inlet (10) in the centre of the housing body (4) and being held in place in the recess (21) or housing body (4) by means of a holder device or arrangement (7), thereby forming a flow path (11) in normal operation going through the central aperture or inlet (10), towards and along the body (9) and out of the recess or housing, characterised by said housing body (4) comprising an inner body part (4a) coaxially and sealingly arranged within a corresponding recess in an outer body part (4b), said inner body part (4a) being axially movable within the outer body part (4a) between a first position and a second position against a predetermined biasing force from a resilient member (24) arranged between said inner and outer body parts (4a, 4b) by an overpressure acting on an outlet side of the valve (2) opposite of a side of the inlet (10) and exceeding said predetermined biasing force of the resilient member (24), said first and second positions providing normal operation via the flow path (11) and reversed flow operation of the valve or control device (2), respectively, wherein in said second position the flow path (11) is closed and a second flow path (25) of reversed flow is created between at least one branch channel (31) in the inner body part (4a) arranged downstream of the controlling body (9) under normal operation and at least one corresponding channel (26) in the outer body part (4b), said corresponding channel (26) extending between an axial interface between the inner and outer body parts (4a, b) and a same side of the valve (2) as the central aperture or inlet (10), said closing of the flow path (11) in the second position of reversed flow being caused by said overpressure pressing the controlling body (9) sealingly against a seat (19) of the inlet (10) at the same time as the inner body part (4a) is lifted in said recess causing the movement into said second position of reversed flow.

The fluid may be composed of one or more gases and/or one or more liquids.

The fluid may be water and oil, or oil and natural or produced gas and/or $CO_2$.

An annular sealing (27) may be provided in an annular slot (28) at the interface between the inner and outer body parts (4a, 4b).

The resilient member (24) may be an annular spring.

The annular spring (24) may be arranged between a locking ring (29) and an annular shoulder (30) of the inner body (4a).

A plurality of flow paths (25) may be equidistantly and circularly arranged at the interface between the inner and outer body parts (4a, 4b).

A plurality of openings (13) may be equidistantly and circularly arranged at the side of the valve (2) oppositely of the inlet (10).

According to another arrangement, there is provided a method for reversed flow through a self-adjustable (autonomous) valve or flow control device (2) according to the first arrangement and/or a previously-described aspect of the present invention, characterized by providing an overpressure on the side of the valve (2) opposite of the side of the inlet (10) exceeding a predetermined biasing force of the resilient member (24) causing lifting of the inner body part (4a) within the outer body part (4b) against said biasing force from a first position of fluid flow between an inner and an outer side of the valve (2) via the flow path (11) and to a second position of reversed fluid flow between said inner and outer side through the second flow path (25).

According to another arrangement, there is provided a use of a self-adjustable (autonomous) valve or flow control device in accordance with an above arrangement and/or a previously-described aspect of the present invention as a check valve in a reversed flow mode, e.g. when injecting steam or scale inhibitor down the production pipe of a well and into an adjacent formation or reservoir.

A "self-adjusting" arrangement provides an improved method for self-adjusting (autonomously adjusting) the flow of a fluid through a valve or flow control device, a self adjusting valve or flow control device, and use of said self adjusting valve or control device, in particular useful in a production pipe for producing oil and/or gas from a well in an oil and/or gas reservoir, which production pipe includes a lower drainage pipe preferably being divided into at least two sections each including one or more inflow control devices which communicates the geological production formation with the flow space of the drainage pipe.

More particularly, a "self-adjusting" arrangement relates to an improvement of the method for flow control and autonomous valve or flow control device as described in International application No. PCT/NO2007/000204 with publication No. WO 2008/004875 A1.

When extracting oil and or gas from geological production formations, fluid of different qualities, i.e. oil, gas, water (and sand) is produced in different amounts and mixtures depending on the property or quality of the formation. None of the above-mentioned, previously-known devices are able to distinguish between and control the inflow of oil, gas or water on the basis of their relative composition and/or quality.

A "self-adjusting" arrangement provides an inflow control device which is self adjusting or autonomous and can easily be fitted in the wall of a production pipe and which therefore provide for the use of work-over tools. Such a device is designed to "distinguish" between the oil and/or gas and/or water and is able to control the flow or inflow of oil or gas, depending on which of these fluids such flow control is required.

An example device embodying the present invention is robust, can withstand large forces and high temperatures, prevents draw dawns (differential pressure), needs no energy supply, can withstand sand production, is reliable, but is still simple and relatively cheap.

Examples of devices and methods are provided by E1-E15 below:

E1. A flow control device (2; 200) comprising: a first flow path (11; 110) to allow fluid to flow from an inlet port (10; 100) provided on an inlet side (33; 330) of the device (2; 200) to an outlet port (13; 130) provided on an outlet side (35; 350) of the device (2; 200); a closure element (9; 90) arranged to prevent fluid flow along the first fluid path (11; 110) in a direction from the outlet port (13; 130) to the inlet port (10; 100); and an arrangement (4a, 4b, 24, 26, 31; 40a, 40b, 240, 260, 310) adapted to open a second fluid path (25; 250), different along at least part of its length from the first fluid path (11; 110), in dependence upon the pressure of fluid at the outlet side (35; 350), the second fluid path (25; 250) allowing fluid to flow from a first relief port (13; 130; 390) provided on the outlet side (35; 350) to a second relief port (37; 370; 100) provided on the inlet side (33; 330).

E2. A flow control device as defined in E1, wherein at least part of the first relief port (13; 130) for the second fluid path (25; 250) is shared with or the same as the outlet port (13; 130) for the first fluid path (11; 110).

E3. A flow control device as defined in E1 or E2, wherein at least part of the second relief port (37; 370) for the second fluid path (25; 250) is separate from the inlet port (10; 100) for the first fluid path (11; 110).

E4. A flow control device as defined in any one of E1 to E3, wherein the arrangement (4a, 4b, 24, 26, 31; 40a, 40b, 240, 260, 310) is adapted to open the second fluid path (25; 250) in response to the pressure of fluid at the outlet side (35; 250) exceeding the pressure of fluid at the inlet side (33; 330) by a predetermined amount.

E5. A flow control device as defined in any one of E1 to E4, wherein the closure element is a movable body (9) provided along the first fluid path (11), the body (9) being arranged such that changes in velocity and/or properties and/or composition of the fluid flowing along the first fluid path (11) result in changes to the forces acting on the body (9) as a result of the Bernoulli principle, thereby autonomously adjusting the flow of fluid through the control device (2).

E6. A flow control device as defined any one of E1 to E5, wherein the closure element (9; 90) is arranged to face the inlet port (10; 100).

E7. A flow control device as defined in any one of E1 to E6, comprising an inner body part (4a; 40a) and an outer body part (4b; 40b), the inner body part (4a; 40a) being sealingly arranged and moveable within the outer body part (4b; 40b) between a first position and a second position under the influence of the pressure of fluid at the outlet side (35), wherein a first part (31; 310) of the second fluid path (25; 250) is formed within the inner body part (4a) and a second part (26; 260) of the second fluid path (25; 250) is formed within the outer body part (4b; 40b), the first and second parts of the second fluid path (25; 250) being in communication with one another when the inner body part (4a; 40a) is in the second position but not when the inner body part (4a; 40a) is in the first position, thereby opening the second fluid path (25; 250) when the inner body part (4a; 40a) moves from the first position to the second position.

E8. A flow control device as defined in E7, comprising a resilient member (24; 240) arranged to provide a predetermined resistance against movement of the inner body part (4a; 40a) from the first position to the second position.

E9. A flow control device as defined in E8, comprising a resilient member (24; 240) arranged to provide a predetermined resistance against movement of the inner body part (4a; 40a) from the first position to the second position, wherein the resilient member (24; 240) is an annular spring.

E10. A flow control device as defined in E8 or E9, wherein the annular spring (24; 240) is arranged between a locking ring (29; 290) and an annular shoulder (30) of the inner body (4a; 40a).

E11. A flow control device as defined in any one of E7 to E10, wherein an annular sealing member (27) is provided in an annular slot (28) at the interface between the inner and outer body parts (4a, 4b; 40a, 40b).

E12. A flow control device as defined any one of E1 to E11, wherein the second fluid path (25; 250) bypasses the closure element (9; 90).

E13. A flow control device as defined in any one of E1 to E12, comprising a plurality of such second flow paths (25; 250) and/or a plurality of such outlet ports (13; 130), E14. A flow control method for use with a flow control device (2; 200) having a first flow path (11; 110) to allow fluid to flow from an inlet port (10; 100) provided on an inlet side (33; 330) of the device (2; 200) to an outlet port (13; 130) provided on an outlet side (35; 350) of the device (2; 200), and a closure element (9; 90) arranged to prevent fluid flow along the first fluid path (11; 110) in a direction from the outlet port (13; 130) to the inlet port (10; 100), the method comprising providing or using an arrangement (4a, 4b, 24, 26, 31; 40a, 40b, 240, 260, 310) to open a second fluid path (25; 250), different along at least part of its length from the first fluid path (11; 110), in dependence upon the pressure of fluid at the outlet side (35; 350), the second fluid path (25; 250) allowing fluid to flow from a first relief port (13; 130; 390) provided on the outlet side (35; 350) to a second relief port (37; 370; 100) provided on the inlet side (33; 330).

E15. A method of controlling the flow of hydrocarbon fluid including any water between a hydrocarbon reservoir and a production pipe (1), the production pipe (1) having one or more production sections, and the method comprising providing or using a flow control device as defined in any one of E1 to E13 in the or each production section of the production pipe (1).

The invention claimed is:

1. A flow control device comprising:
a first flow path to allow fluid to flow from an inlet port provided on an inlet side of the device to an outlet port provided on an outlet side of the device;
a closure element arranged to prevent fluid flow along the first fluid path in a direction from the outlet port to the inlet port; and
an arrangement adapted to open a second fluid path, different along at least part of its length from the first fluid path, in dependence upon a pressure of fluid at the outlet side, the second fluid path allowing fluid to flow from a first relief port provided on the outlet side to a second relief port provided on the inlet side,
wherein the flow control device comprises an inner body part and an outer body part, the inner body part being sealingly arranged and moveable within the outer body part between a first position and a second position under the influence of the pressure of fluid at the outlet side, wherein a first part of the second fluid path is formed within the inner body part and a second part of the second fluid path is formed within the outer body part, the first and second parts of the second fluid path being in communication with one another when the inner body part is in the second position but not when the inner body part is in the first position, thereby opening the second fluid path when the inner body part moves from the first position to the second position.

2. The flow control device as claimed in claim 1, wherein at least part of the first relief port for the second fluid path is shared with or the same as the outlet port for the first fluid path.

3. The flow control device as claimed in claim 1, wherein at least part of the second relief port for the second fluid path is separate from the inlet port for the first fluid path.

4. The flow control device as claimed in claim 1, wherein the arrangement is adapted to open the second fluid path in response to the pressure of fluid at the outlet side exceeding a pressure of fluid at the inlet side by a predetermined amount.

5. The flow control device as claimed in claim 1, wherein the closure element is a movable body provided along the first fluid path, the body being arranged such that changes in velocity and/or properties and/or composition of the fluid flowing along the first fluid path result in changes to the forces acting on the body as a result of the Bernoulli principle, thereby autonomously adjusting the flow of fluid through the control device.

6. The flow control device as claimed claim 1, wherein the closure element is arranged to face the inlet port.

7. The flow control device as claimed in claim 1, comprising a resilient member arranged to provide a predetermined resistance against movement of the inner body part from the first position to the second position.

8. The flow control device as claimed in claim 1, comprising a resilient member arranged to provide a predetermined resistance against movement of the inner body part from the first position to the second position, wherein the resilient member is an annular spring.

9. The flow control device as claimed in claim 8, wherein the annular spring is arranged between a locking ring and an annular shoulder of the inner body.

10. The flow control device as claimed in claim 1, wherein an annular sealing member is provided in an annular slot at an interface between the inner and outer body parts.

11. The flow control device as claimed in claim 1, wherein the second fluid path bypasses the closure element.

12. The flow control device as claimed in claim 1, comprising a plurality of such second fluid paths and/or a plurality of such outlet ports.

13. A flow control method for use with a flow control device having a first flow path to allow fluid to flow from an inlet port provided on an inlet side of the device to an outlet port provided on an outlet side of the device, and a closure element arranged to prevent fluid flow along the first fluid path in a direction from the outlet port to the inlet port, the method comprising:

providing or using an arrangement to open a second fluid path, different along at least part of its length from the first fluid path, in dependence upon a pressure of fluid at the outlet side, the second fluid path allowing fluid to flow from a first relief port provided on the outlet side to a second relief port provided on the inlet side, wherein the flow control device comprises an inner body part and an outer body part, the inner body part being sealingly arranged and moveable within the outer body part between a first position and a second position under the influence of the pressure of fluid at the outlet side, wherein the method comprises a first part of the second fluid path being formed within the inner body part and a second part of the second fluid path being formed within the outer body part, the first and second parts of the second fluid path being in communication with one another when the inner body part is in the second position but not when the inner body part is in the first position, thereby opening the second fluid path when the inner body part moves from the first position to the second position.

14. A method of controlling the flow of hydrocarbon fluid including any water between a hydrocarbon reservoir and a production pipe, the production pipe having one or more production sections, and the method comprising:

providing or using the flow control device as claimed in claim 1 in the or each production section of the production pipe.

\* \* \* \* \*